Patented May 13, 1947

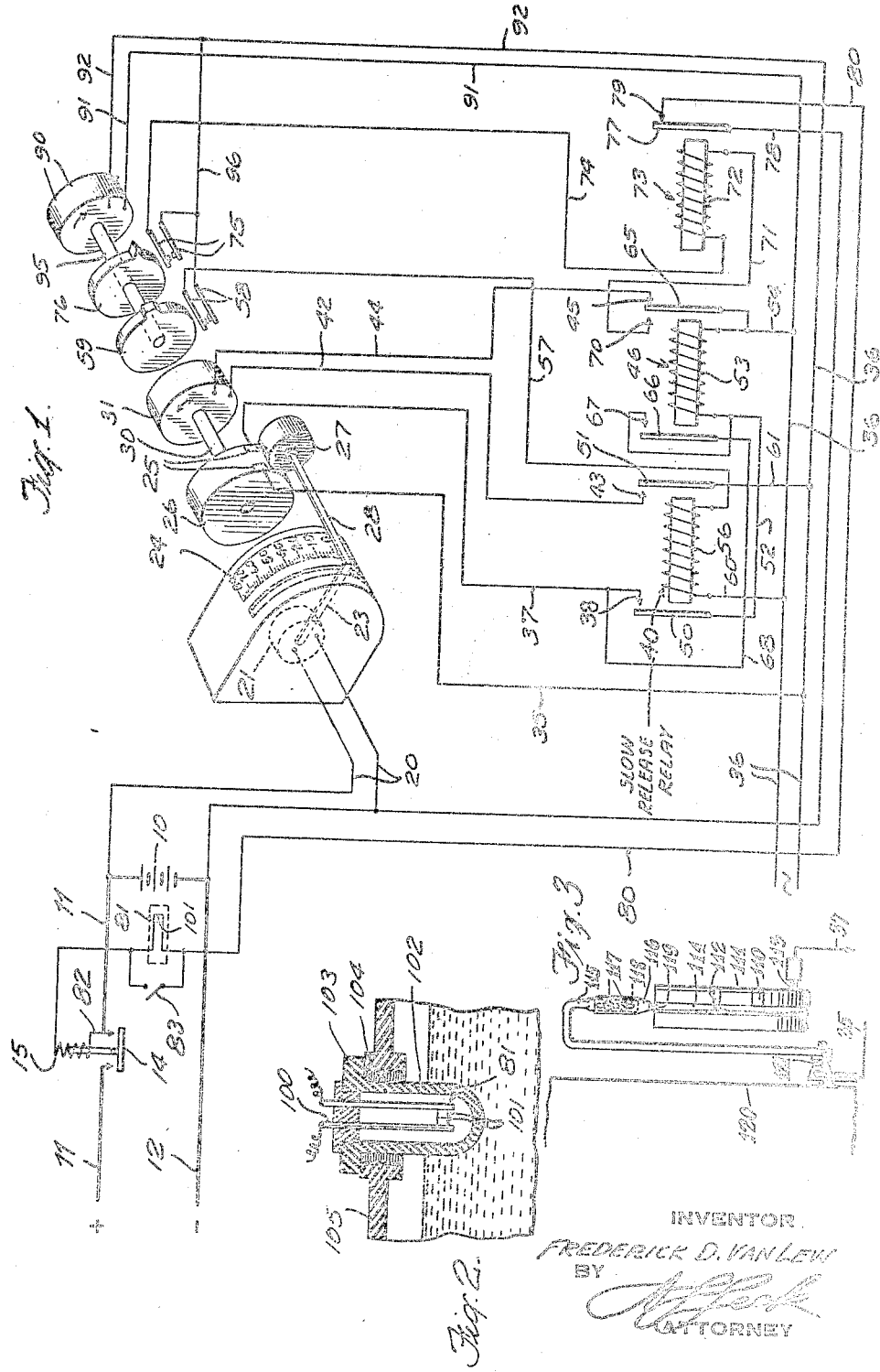

2,420,577

UNITED STATES PATENT OFFICE 2,420,577

ELECTRIC CONTROL SYSTEM

Frederick D. Van Lew, Bronxville, N. Y.

Application June 23, 1945, Serial No. 601,102

12 Claims. (Cl. 320—40)

This invention relates to an electric control system which is responsive to a predetermined change in rate of variation of a condition.

The invention is applicable to battery charging systems, chemical process control systems, or the like, in which a condition may initially vary, but finally reaches a stable state which may indicate the completion of the process. In charging certain types of storage batteries, for example, the voltage rises or varies continuously as the charge progresses and becomes substantially constant when the battery is fully charged. The charge is completed when the voltage remains constant for a certain period.

An object of the present invention is to provide an automatic control which responds to a predetermined change in the rate of variation of a voltage or other condition.

Another object is to provide a system which is actuated automatically when the condition under measurment remains constant for a predetermined period of time.

Another object is to provide an automatic means to interrupt the charging circuit of a storage battery when the voltage characteristic indicates completion of the charge.

Various other objects and advantages will be apparent as the nature of the invention is more fully disclosed.

In one embodiment, the control circuit is actuated when the battery voltage ceases to rise and remains constant for a predetermined period of time. The control circuit may be connected to break the charging circuit so as to stop the charge automatically at the proper time. This is accomplished by means of time selectors and relays connected to scan the position of the voltmeter indicator at predetermined intervals and to actuate a relay when there is no change in reading between successive scannings. The scanning may be effected by contacts, magnetic control, photoelectric control, or other means, including a follow-up mechanism, as will be described.

Although the novel features which are believed to be characteristic of this invention are pointed out more particularly in the claims appended thereto, the invention itself will be better understood by referring to the following description taken in connection with the accompanying drawings in which a specific embodiment thereof has been set forth for purposes of illustration.

In the drawings:

Fig. 1 is a schematic diagram of a control system embodying the present invention;

Fig. 2 is a detail view of the battery thermostat; and

Fig. 3 is a detail view of another embodiment of the contact arm and drum.

Referring to the drawings more in detail, the invention is shown as applied to a control system for controlling the charging circuit to a storage battery 10. The storage battery 10 is shown as connected to positive and negative leads 11 and 12 respectively which are connected to any suitable source of charging current such as D. C. mains or a motor generator set or a rectifier of standard type. In the embodiment shown, the charging circuit is controlled by a circuit breaker 14 which is normally open and is provided with a holding coil 15 for holding the circuit breaker in closed position.

The battery 10 is shown as connected by leads 20 to the driving element 21 of a voltmeter 22 having a moving arm 23 and a drum scale 24 of the usual construction. The voltmeter 22 is assumed to be of the type developing sufficient torque to permit the arm 23 to actuate a mechanical contact or, if desired, the arm 23 may control a relay circuit magnetically or electrostatically, or the voltmeter may be of the photoelectric control type. In any event, the contacts, whether relay controlled or mechanically controlled, are represented in Fig. 1 as contacts 25 mounted on a drum 26 and positioned to be engaged by a roller 27 carried on a shaft 28 attached to the arm 23 and so arranged that the roller sweeps over the surface of the drum 26 as the arm 23 swings over the scale 24.

The drum 26 is connected by a shaft 30 to be driven by an electric motor 31 such as a D. C. motor or a synchronous motor of the clock motor type which is arranged to drive the drum at a speed, for example, of two revolutions per minute.

One of the contacts 25 is connected by a line 35 to one side of a main 36 which may be connected to a source of either alternating or direct current for controlling the motors and relays to be described. The other contact 25 is connected by line 37 to a normally open contact 38 of a relay 40. One supply lead 42 to the motor 31 is connected to a second normally open contact 43 of the relay 40. The other supply lead 44 of the motor 31 is connected to a normally closed contact 45 of a second relay 46.

The first relay 40 is provided with armatures 50 and 51 which are adapted to engage contacts 38 and 43, respectively, when the relay is energized. The armature 50 is connected by a line 52 to the energizing coil 53 of the second relay 46, the return lead 54 of which is connected to the return line of the main 36. The relay 40 is provided with an energizing coil 56, one side of which is connected by a line 57 to one of a pair of contacts 58 which are connected to be closed by a timer cam 59. The return lead of the coil 56 is connected by a line 60 to the main 36. The armature 51 of the relay 40 is connected by a line 61 to the main 36.

The second relay 46 is provided with an armature 65 normally engaging the contact 45 and an armature 66, shown as a second armature, which is connected to close a normally open contact 67. The contact 67 is connected to the line 52 and the armature 66 is connected by a line 68 to the line 37 so that the contact 67 constitutes a holding contact for the relay 46. It is to be understood that the various contacts of each relay may be actuated by a common armature provided with separate circuit controls if desired.

The armature 65 of the relay 46 engages a front contact 70 which is connected by a line 71 to the energizing coil 72 of a third relay 73. The other side of the coil 72 is connected by a line 74 to one of a pair of contacts 75 which are connected to be closed by a timer cam 76. The third relay 73 is provided with an armature 77 which is connected by a line 78 to the battery supply line 12 and with a normally closed contact 79 which is connected by a line 80 to contacts 101 controlled by a thermostat 81 and thence to the holding coil 15 of the circuit breaker 14 and thence by line 82 to the battery supply line 11 on the battery side of the circuit breaker 14. The thermostat 81 may be short-circuited by a switch 83 when its use is not required.

The timer cams 59 and 76 are driven continuously by the shaft 95 of a motor 90 which may be of the direct or of the synchronous type and may operate to drive the timer cams at a speed of, for example, two revolutions per hour. The motor 90 is supplied by lines 91 and 92 which are connected to the main 36. The other of the pairs of contacts 58 and 75 are connected by a line 96 to the line 92.

The timer cams 59 and 76 are shown as driven by the shaft 95 of the motor 90 and close the contacts 58 and 75 for predetermined periods of time during each revolution of the shaft 95. If the motor 90 is designed to cause the timer cams 59 and 76 to make one complete revolution in thirty minutes, the timer cam 76 may be designed to close the contacts 75 at the end of 28 minutes and hold these contacts closed for a period of about 30 seconds. The timer cam 59 may close the contacts 58 at the end of 30 minutes and may hold these contacts closed for a period of approximately 2 minutes. Any standard type of repeating-timing switch may be used for this purpose. A rotary cam-operated timer has been shown merely as representative.

Referring to Fig. 2, the thermostat 81 is shown as comprising a bimetallic element 100 controlling contacts 101 and mounted in a casing 102 of insulated material such as rubber, which is provided with a flange 103. The casing 102 is designed to pass within the filler opening 104 of the cover 105 of the storage battery until the device rests upon the flange 103. The thermostat is thus immersed in the electrolyte and responds to the electrolyte temperature.

In the operation of this device, closing of the contacts 58 by the 30-minute-timer cam 59 energizes the coil 56 of the first relay 40 and holds the coil energized for the stated period, for example 2 minutes. Actuation of the relay 40 closes the contact 38 and thereby completes a connection from the line 37 through the armature 50 and line 52 to the coil 53 of the second relay 46. The coil 53, however, is not energized until the contacts 25 are closed by the roller 27. The closing of the contact 43 by the armature 51 also completes the circuit from the main 36 through the line 61, armature 51, contact 43, lead 42 to the motor 31, thence through the motor to the lead 44, back contact 45 of the relay 46, armature 65 and lead 54, back to the main 36, thereby causing the motor 31 to operate and to drive the drum 26.

As soon as the drum 26 reaches a position such that the contacts 25 are closed by the roller 27, the circuit is completed to the coil 53 of the second relay 46, as above described, causing this relay to operate. Operation of this relay breaks the back contact 45 and interrupts the circuit to the motor 31, thereby stopping the drum 26 in position to leave the contacts 25 and 27 closed. Actuation of the armature 65 closes the front contact 70 and sets up a circuit through the coil 72 of the third relay 73 to the contacts 75. The circuit, however, is not completed unless the contacts 75 are closed by the timer cam 76. Actuation of the second relay 46 also closes the contact 67 and sets up a holding circuit through the lines 68 and 37 and the contacts 25 which holds the relay 46 energized until the contacts 25 are broken.

The armature 66 of relay 46 must close the contact 67 before the contact 38 of relay 40 is opened. This may be accomplished by making the armature 50 of the slow release type.

The holding coil 15 of the circuit breaker 14 is normally energized through thermostat 81 and the contact 79 and armature 77 of the third relay 73, thereby maintaining the battery on charge. However, when either the relay 73 or the thermostat 81 is actuated, the circuit to the holding coil 15 is broken and the circuit breaker 14 is allowed to open, thereby disconnecting the battery 10 from the charging circuit. The thermostat 81 is designed to operate only when the temperature of the electrolyte within the battery exceeds a predetermined value which indicates conditions harmful to the battery.

After the relay 46 has been set up as above described, it will be held in energized condition as long as the contacts 25 remain closed, even though the contacts 58 are opened at the end of the two minute period. If the contacts 75 are made by the timer cam 76 while the contacts 25 are held closed and the circuit to the third relay coil thus set up, the relay 73 will be actuated to break the contact 79 and open the circuit breaker 14 as above mentioned. If, however, the contacts 25 are broken before the timer cam 76 closes the contact 75, the relay 73 will not operate. It will thus be noted that the relay 73 is operated only if the contacts 25 remain closed for the period of approximately 28 minutes after the actuation of the contacts 58 by the timer cam 59 and until the contacts 75 are closed by the timer cam 76. If this occurs, it indicates that the roller 27 and arm 23 are in the same position as at the beginning of the 28 minute period which is the assumed condition to indicate the completion of the battery charge. If during this 28 minute period, the voltage of the battery varies sufficiently to open the contacts 25, the relay 73 will not operate and the cycle is repeated at the next closing of the contacts 58.

If the contacts 25 have been broken by movement of the arm 23 and roller 27 prior to the subsequent closing of the contacts 75 by the timer cam 76, there is no actuation of the relay 73, but the relay 46 will release. However, when the contacts 58 are again closed by the timer cam 59 at the end of the thirty minute period, the relay 40 is actuated to complete the driving circuit to the motor 31 as above described and causes this motor to drive the drum 26 until the contacts 25 are brought under the new position of the roller 27. When this occurs, the motor 31 is stopped by actuation of the relay 46 and the circuit is set up for test at the end of the next twenty-eight minute period. If there is sufficient movement of the pointer 23 between test periods to open the contacts 25 the control relay 73 is not actuated, but the motor 31 is again actuated when contacts 58 are closed to bring the contacts 25 into engagement with the roller 27 in its new position and to set the device up for the subsequent test when the contacts 75 are again closed by the timer cam 76.

The system thus acts to check the position of the arm 23 at predetermined intervals and acts to operate the relay 73 if there has not been sufficient movement of the arm 23 between successive check periods to break the contacts 25.

The sweep of the contacts 25 is such that the contacts do not remain closed if a predetermined voltage change takes place. The movement of the arm 23 and of the roller 27 may be made such that, for the range under test, the normal voltage change in the battery at the end of each thirty minute charge will be sufficient to open the contacts 25, and when the contacts 25 remain closed for the thiry minute period the storage battery is in fully charged condition.

The roller 27 need not close the contacts 25 mechanically, but may comprise a magnetic or capacitive control member which energizes the control circuit for the relay 46 by varying the impedance of the control circuit when in register with the contacts 25. A photoelectric control member may also be used, for example an electronic voltmeter. Mechanical contacts have been shown for simplicity only.

In the embodiment of Fig. 3, for example, the contact drum 110 is shown as provided with a contact ring 111 and a contact strip 112 which makes contact with the ring 111 and extends across the face of the drum 110. The drum is provided wtih a peripheral groove 114 across which the strip 112 extends. A brush 113 makes contact with the ring 111 and is connected to the line 37 which corresponds to the line 37 in Fig. 1.

A meter 120 is provided with a shaft 121 carrying a pointer 115 which is arranged to swing across the face of the meter in the usual manner. The lead 35 (Fig. 1) is connected to the shaft 121 and so makes contact with the pointer 115.

In the form shown the end of the pointer 115 is bent over and carries a contact strip 116 which is adjustably attached thereto by screws 117 extending through elongated slots 118 in said strip 116. The strip 116 carries a point 119 of contact material such as platinum, which rests in the groove 114 and makes contact with the strip 112 when in registration therewith.

The U-shaped bend of the pointer 115 provides resilience to hold the contact 119 in the groove 114. The tension may be adjusted by the screws 117. The drum 110 corresponds to the drum 26 of Fig. 1 and is connected to be driven in a similar way about an axis coinciding with the axis of the shaft 121 so that the contact 119 slides around the surface of the drum in response to relative movement of the pointer and drum. The operation is otherwise identical with that of the arm 28 and drum 26 of Fig. 1.

Of course a pair of strips 112 may be provided if desired and the contact 119 arranged to complete a circuit therebetween. The form shown however eliminates one brush contact.

It is to be understood that the system is applicable to various uses, for example to certain chemical processes wherein the control is dependent on the rate of change of a condition. It is also evident that the control may be reversed and may respond to a predetermined change during the timed interval and be non-responsive to constant conditions during such interval. The system may of course be connected to respond to current changes as well as voltage changes and may be varied in other respects as will be apparent to a person skilled in the art.

Although a specific embodiment of the invention has been shown for purposes of illustration, it is to be understood that the invention is only to be limited in accordance with the scope of the following claims.

What is claimed is:

1. A system responsive to variations in the rate of change of a movable member, comprising a circuit control element actuated by said member, a second circuit control element movable in a path to cooperate with said first element when in registration therewith, circuit means actuated periodically to bring said second element into registration with said first element, relay means, and timed means operating a predetermined time interval after said circuit means and connected to actuate said relay if said elements are still in registration.

2. A system responsive to variations in the rate of change of a movable member, comprising a circuit control element actuated by said member, a second circuit control element movable in a path to cooperate with said first element when in registration therewith, driving means for said movable element, circuit means including a timed switch to actuate said driving means, means responsive to registration of said elements to stop said driving means, relay means, and circuit means including a second timed switch operating a predetermined time interval after said first switch to actuate said relay means if said elements are still in registration.

3. A system responsive to variations in the rate of change of a movable member, comprising a circuit control element actuated by said member, a second circuit control element movable in a path to cooperate with said first element when in registration therewith, driving means for said movable element, a pair of switch means, a controller to actuate said switch means in a predetermined time sequence, driving means for said controller, means responsive to one of said switch means to actuate said first driving means, means responsive to registration of said elements to stop said first driving means with said elements in registration, and circuit means responsive to registration of said elements and to actuation of said second switch means.

4. A system responsive to variations in the rate of change of a movable member, comprising a circuit control element actuated by said member, a second circuit control element movable in a path to cooperate with said first element when in registration therewith, driving means for said movable element, a pair of switch means, a controller to actuate said switch means in a predetermined time sequence, driving means for said controller, means responsive to one of said switch means to actuate said first driving means, means responsive to registration of said element to stop said first driving means with said elements in registration, relay means, and circuit means responsive to registration of said elements and to actuation of said second switch means to actuate said relay means.

5. A system responsive to variations in the rate of change of a movable member, comprising a circuit control element actuated by said member, a second circuit control element movable in a path to cooperate with said first element when in registration therewith, driving means for said movable element, a pair of switch means, a controller to actuate said switch means in a predetermined time sequence, driving means for said controller, a control circuit for said first driving means including a normally open contact and a normally closed contact, a relay to close said normally open contact, means responsive to one of said switch means to actuate said relay and thereby energize said first driving means, a second relay to open said normally closed contact, a second normally open contact on said first relay, circuit means responsive to closing of said last contact and to registration of said elements to actuate said second relay and thereby open said normally closed contact and stop said first driving means, a holding circuit for said second relay responsive to registration of said elements, a normally open contact actuated by said second relay, and a control circuit including said last contact and the second timed switch.

6. A voltage responsive system comprising a voltage responsive device having a movable arm, a contactor actuated by said arm, a drum having contacts to engage said contactor and movable to follow-up said contactor, drive means for said drum, a pair of timed switches, means actuating said switches in predetermined time sequence, circuit means including said first timed switch to actuate said drive means, means to stop said drive means when said drum contacts engage said contactor, and a control circuit actuated by said second timed switch, said control circuit including said drum contacts and being energized only when said drum contacts engage said contactor during the operation of said second timed switch.

7. A voltage responsive system comprising a voltage responsive device having a movable arm, a pair of circuit control elements, one of said elements being carried by said arm, follow-up mechanism carrying the other of said elements, a control circuit responsive to registration of said elements, timed means to actuate said follow-up mechanism periodically to bring said elements into registration, timed switch means actuated periodically a predetermined time interval after said first timed means, and a control circuit actuated in response to said timed switch means and to registration of said elements.

8. A battery charging circuit control system comprising a battery charging circuit, a control device for interrupting the charge including a relay, a voltage responsive device connected to respond to the battery voltage, a pair of circuit control elements, means actuated by said voltage responsive device to shift one of said elements as a function of voltage, follow-up means for the other of said elements, a control circuit responsive to registration of said elements, timed means to actuate said follow-up mechanism periodically to bring said elements into registration, timed switch means actuated periodically a predetermined time interval after said first timed means, a control circuit actuated in response to said timed switch means and to registration of said elements, and means responsive to said control circuit to actuate said relay and interrupt the charge.

9. A storage battery charging circuit control system, comprising a charging circuit, a control relay therefor, a voltmeter connected to respond to the battery voltage, means periodically set as a function of the reading of said voltmeter, and means responsive to two successive unchanged settings of said last means to actuate said control relay for interrupting the charge.

10. A storage battery charging circuit control system, comprising a charging circuit, a control relay therefor, a voltmeter connected to respond to the battery voltage, means periodically set as a function of the reading of said voltmeter, means responsive to two successive unchanged settings of said last means to actuate said control relay for interrupting the charge, a thermostat connected to respond to battery temperature, and means responsive to said thermostat to actuate said relay for interrupting the charge.

11. A control system comprising a device having a movable element, a control circuit, means periodically settable as a function of the position of said element, and means responsive to two successive unchanged settings of said last means to actuate said control circuit.

12. A control system comprising a device having a movable indicator arm, a contact member carried by said arm, a second contact member, follow-up means to bring said members into contact, timed means to actuate said follow-up means at predetermined intervals, a circuit including said contact elements, and timed means to energize said circuit at predetermined intervals after each actuation of said first timed means for testing the condition of said contact members.

FREDERICK D. VAN LEW.

REFERENCES CITED

The following references are of record in the file of this patent:

UNITED STATES PATENTS

| Number | Name | Date |
|---|---|---|
| 796,064 | Duncan | Aug. 1, 1905 |
| 1,118,099 | Beach | Nov. 24, 1904 |
| 1,021,293 | Apple | Mar. 26, 1912 |
| 1,125,080 | Eisemann | Jan. 19, 1915 |
| 1,222,257 | Auth | Apr. 10, 1917 |
| 1,812,628 | Geiger | June 30, 1931 |